United States Patent [19]

Jaffe et al.

[11] Patent Number: 4,892,899
[45] Date of Patent: Jan. 9, 1990

[54] NOVEL COMPOSITIONS BASED ON TETRACHLOROISOINDOLINONE PIGMENTS

[75] Inventors: Edward E. Jaffe, Wilmington, Del.; Jost von der Crone, Arconciel; Bernhard Medinger, Giffers, both of Switzerland

[73] Assignee: Ciba-Geigy Corporation, Ardsley, N.Y.

[21] Appl. No.: 130,245

[22] Filed: Dec. 8, 1987

[51] Int. Cl.$^4$ .................. C08K 5/34; C07D 209/50
[52] U.S. Cl. .................. 524/83; 106/266; 106/494; 106/498; 106/501; 524/89; 524/92; 524/94; 544/109; 544/360; 544/367; 544/368; 544/373; 546/139; 546/182; 546/187; 546/256; 546/270; 546/271; 546/272; 548/136; 548/145; 548/159; 548/444; 548/454; 548/460; 548/471
[58] Field of Search .............. 548/460, 471, 444, 454, 548/159, 145, 136, 467, 300; 106/266, 501, 494, 498; 546/272, 187, 270, 271, 256, 182, 139; 524/83, 89, 92, 94; 544/109, 373, 367, 360, 368, 405

[56] References Cited

U.S. PATENT DOCUMENTS

| | | | |
|---|---|---|---|
| 3,076,815 | 2/1963 | Pugin | 260/325 |
| 3,758,497 | 9/1973 | Pugin et al. | 260/325 |
| 4,223,152 | 9/1980 | Fujii et al. | 548/460 |
| 4,692,189 | 9/1987 | Bäbler et al. | 106/308 S |
| 4,764,217 | 8/1988 | von der Crone et al. | 548/471 |

Primary Examiner—Mary E. Ceperley
Attorney, Agent, or Firm—JoAnn Villamizar

[57] ABSTRACT

Composition of matter containing
(a) a compound of the formula I

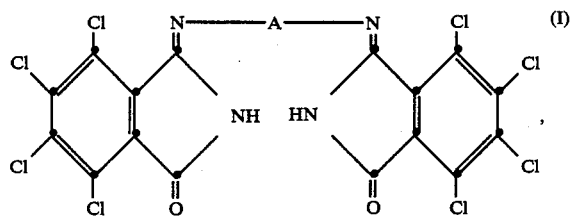

in which A is one of the groups of the formulae

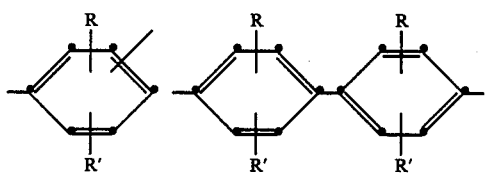

-continued

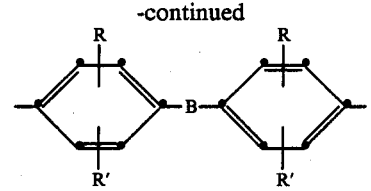

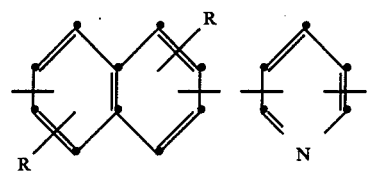

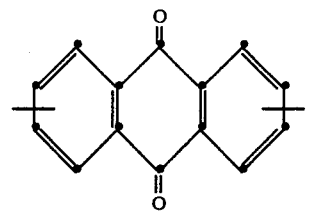

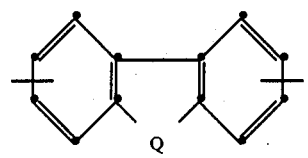

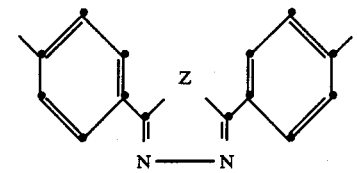

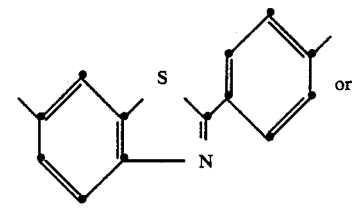

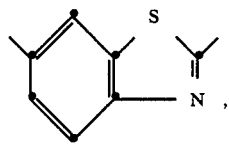

in which B is —O—, —S—, —SO$_2$—, —N=N—, —CH$_2$—, —CH=CH—, (Abstract continued on next page.)

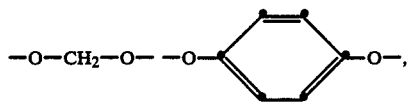

—CONH—, —NHCONH—, or —CONHNHCO—, Q is —O— or —NH— and Z is —O— or —S— and R and R' are independently of each other hydrogen, halogen, $C_1$–$C_4$-alkyl, $C_1$–$C_4$-alkoxy or phenoxy, and (b) a compound of the formula II

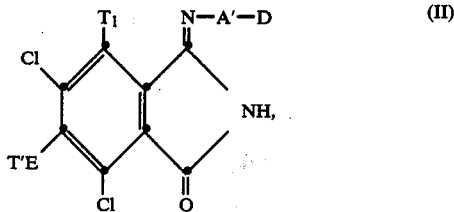

in which A' is as defined above for A, D is hydrogen, amino or a group of the formula III

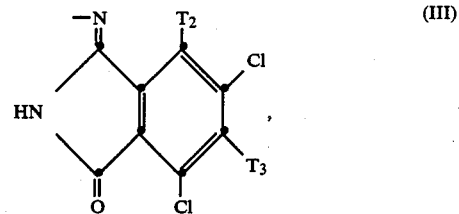

E is —O— or —S—, $T_1$, $T_2$ and $T_3$ independently of one another are chlorine or a group —ET', T' is a group of the formulae

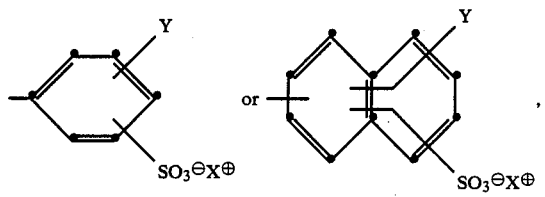

$X^\oplus$ is $H^\oplus$ or a group of the formulae $M^{n\oplus}/n$ or $N^\oplus(R_1)(R_2)(R_3)(R_4)$, Mhu $n\oplus$ is an n-valent metal cation, n is 1, 2 or 3, $R_1$, $R_2$, $R_3$ and $R_4$ are independently of one another hydrogen, $C_1$–$C_{18}$-alkyl, $C_5$–$C_6$-cycloalkyl, unsubstituted or $C_1$–$C_{18}$-alkyl-substituted phenyl or $R_3$ and $R_4$ together with the N atom form a pyrrolidine, imidazolidine, piperidine, piperazine or morpholine radical, or $R_2$, $R_3$ and $R_4$ together with the N atom form a pyrrole, pyridine, picoline, pyrazine, quinoline or isoquinoline radical and Y is hydrogen, halogen, methyl, methoxy or amino.

Pigment mixtures of this type, in particular when used in paints, are distinguished in particular by increased tinctorial strength and high luster and especially by improved rheology.

29 Claims, No Drawings

NOVEL COMPOSITIONS BASED ON TETRACHLOROISOINDOLINONE PIGMENTS

The invention relates to compositions containing a bis-(tetrachloroisoindolinone) pigment and a sulfonated isoindolinone compound and to the use thereof for coloring high molecular weight organic material.

Tetrachloroisoindolinone pigments, which have long been used for coloring high molecular weight organic material (cf. for example DE Auslegeschrift 1,098,126 and DE Offenlegungsschrift 1,914,271), do not always meet the requirements of modern industry, in particular in respect of their rheological properties.

It has now been found that by adding certain sulfonated isoindolinone compounds to bis-(tetrachloroisoindolinone) pigments the rheological behaviour of the latter is surprisingly improved.

The present invention accordingly provides a composition containing (a) an isoindolinone pigment of the formula I

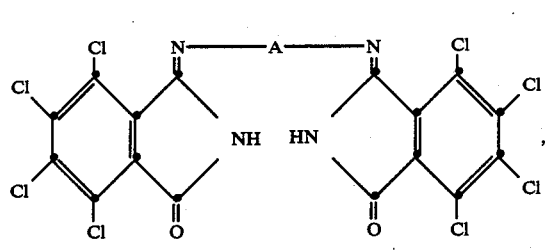

in which A is one of the groups of the formulae

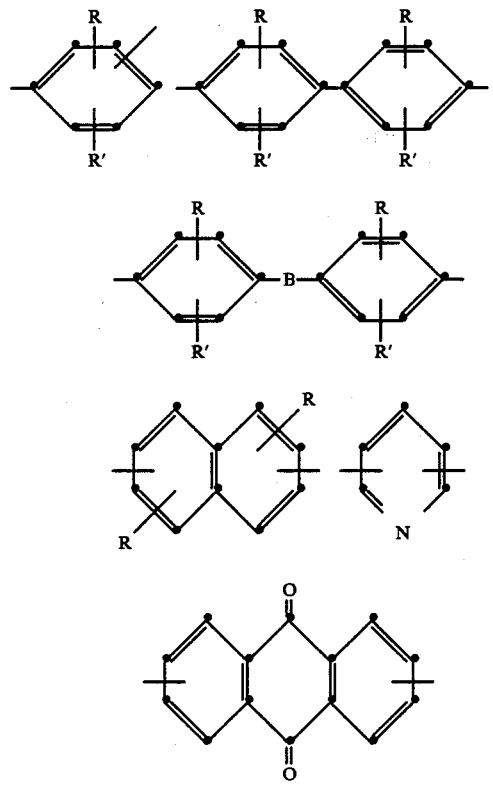

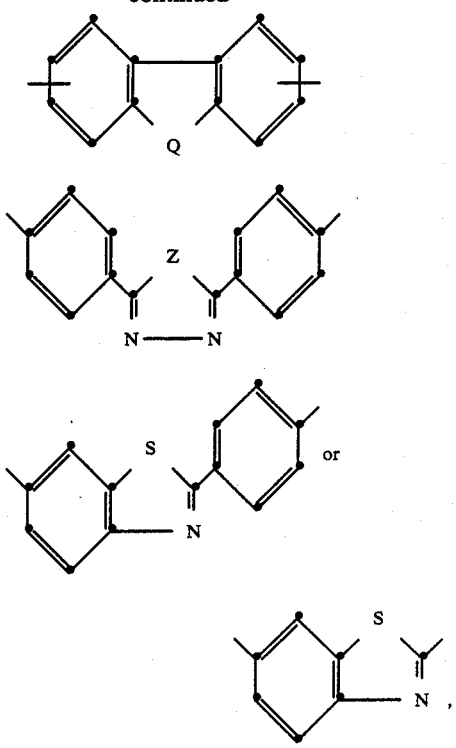

in which B is —O—, —S—, —SO$_2$—, —N=N—, —CH$_2$—, —CH=CH—,

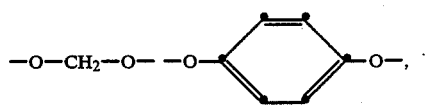

—CONH—, —NHCONH—, or —CONHNHCO—, Q is —O— or —NH— and Z is —O— or —S— and R and R' are independently of each other hydrogen, halogen, C$_1$-C$_4$-alkyl, C$_1$-C$_4$-alkoxy or phenoxy, and (b) a compound of the formula II

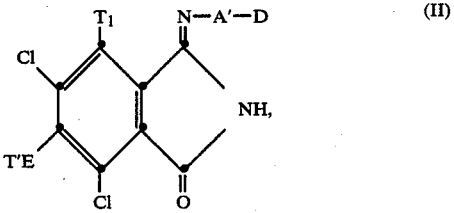

in which A' is as defined above for A, D is hydrogen, amino or a group of the formula III

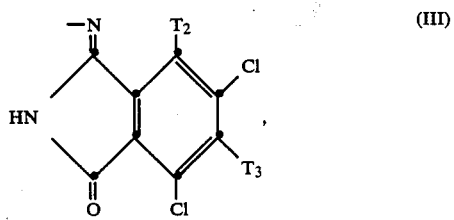

E is —O— or —S—, $T_1$, $T_2$ and $T_3$ independently of one another are chlorine or a group —ET', T' is a group of the formulae

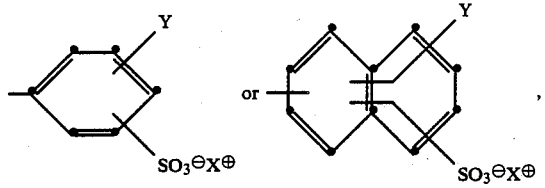

$X^\oplus$ is $H^\oplus$ or a group of the formulae $M^{n\oplus}/n$ or $N^\oplus(R_1)(R_2)(R_3)(R_4)$, $M^{n\oplus}$ is an n-valent metal cation, n is 1, 2 or 3, $R_1$, $R_2$, $R_3$ and $R_4$ are independently of one another hydrogen, $C_1$–$C_{18}$-alkyl, $C_5$–$C_6$-cycloalkyl, unsubstituted or $C_1$–$C_{18}$-alkyl-substituted phenyl or $R_3$ and $R_4$ together with the N atom form a pyrrolidine, imidazolidine, piperidine, piperazine or morpholine radical, or $R_2$, $R_3$ and $R_4$ together with the N atom form a pyrrole, pyridine, picoline, pyrazine, quinoline or isoquinoline radical and Y is hydrogen, halogen, methyl, methoxy or amino.

A halogen substituent is for example fluorine, preferably bromine and in particular chlorine.

A $C_1$–$C_4$-alkyl R or R' is for example, methyl, ethyl, n-propyl, isopropyl, n-butyl, sec.-butyl or tert.-butyl. Methyl is preferred.

A $C_1$–$C_4$-alkoxy R or R' is for example methoxy, ethoxy, n-propoxy, n-butoxy or sec-butoxy. Methoxy is preferred.

A and A' are each preferably a phenylene group of the formula

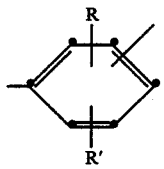

In this meaning A and A' are each for example an unsubstituted p- or m-phenylene group or a 2-chloro-1,4-phenylene, 2-methyl-1,4-phenylene, 2-ethyl-1,4-phenylene, 2-n-propyl-1,4-phenylene, 2-isopropyl-1,4-phenylene, 2-tert.-butyl-1,4-phenylene, 2-methoxy-1,4-phenylene, 2-ethoxy-1,4-phenylene, 2-tert.-butoxy-1,4-phenylene, 2,5-dichloro-1,4-phenylene, 2,5-dimethyl-1,4-phenylene, 2,5-diethyl-1,4-phenylene, 2,5-dimethoxy-1,4-phenylene, 2,5-diethoxy-1,4-phenylene, 2-chloro-5-methyl-1,4-phenylene, 2-chloro-5-methoxy-1,4-phenylene, 2-methyl-5-methoxy-1,4-phenylene, 2,6-dichloro-1,4-phenylene, 2,6-dimethyl-1,4-phenylene, 2-chloro-6-methoxy-1,4-phenylene, 2-chloro-1,3-phenylene, 2-methyl-1,3-phenylene, 2-methoxy-1,3-phenylene, 2,5-dichloro-1,3-phenylene, 2,5-dimethyl-1,3-phenylene or 2-chloro-5-methyl-1,3-phenylene group, but in particular a 1,4-phenylene group which is monosubstituted by chlorine, methyl, methoxy or ethoxy in the 2-position or disubstituted identically or differently in the 2,5-position by chlorine, methyl, methoxy or ethoxy. The unsubstituted p-phenylene group is preferred.

A group A or A' of the formula

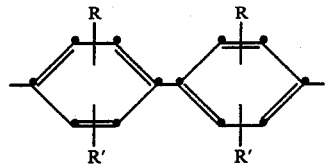

is for example an unsubstituted 4,4'-biphenylylene group or a 3,3'-dichloro-, 3,3'-dimethyl-, 3,3'-diethyl-, 3,3'-diisopropyl-, 3,3'-di-n-butyl-, 3,3'-di-tert.-butyl-, 3,3'-dimethoxy-, 3,3'-diethoxy-, 3,3'-di-tert.-butoxy-, 3,3',5,5'-tetrachloro-, 3,3',5,5'-tetramethyl-, 3,3',5,5'-tetramethoxy-, 3,3'-dichloro-5,5'-dimethyl-, 3,3'-dichloro-5,5'-dimethoxy-, 3,3'-dimethyl-5,5'-dimethoxy-4,4'-biphenylylene group, but in particular a 4,4'-biphenylylene group identically disubstituted in the 3,3'-position by chlorine, methyl, methoxy or ethoxy.

A group A or A' of the formula

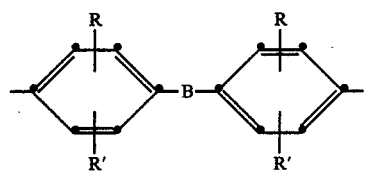

is for example a p,p'-diphenylylene ether, p,p'-diphenylylene sulfide, p,p'-diphenylylene sulfone, p,p'-diphenylyleneazo, diphenylylene methane, p,p'-diphenylylene ethene, p,p'-diphenylylene dioxymethane, p,p'-diphenylylene dioxybenzene, p,p'-diphenylylene carbamide, p,p'-diphenylylene urea or p,p'-diphenylylene dicarbamyl hydrazine group which can each be substituted in the same way as the abovementioned biphenylylene derivatives, but are preferably unsubstituted.

A and A' are also each for example 1,4-, 1,5- or 2,6-naphthylene, 1,5-anthraquinonediyl, 1,4-anthraquinonediyl, 2,6-pyridinediyl, 2,7-carbazolediyl, 2,8-dibenzofurandiyl, 3,8-dibenzofurandiyl, 3,7-dibenzofurandiyl, 6,4'-(2-phenyl)-benzothiazolediyl, 2,6-benzothiazolediyl, 4',4''-(2,5-bisphenyl)-oxadiazolediyl or 4',4''-(2,5-bisphenyl)-thiadiazolediyl which can each be substituted in the same way as the abovementioned biphenylylene derivatives, but are preferably unsubstituted.

The group —ET' can be for example one of the following groups

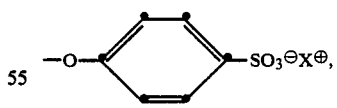

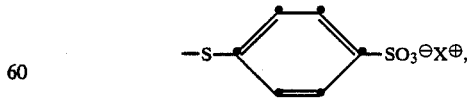

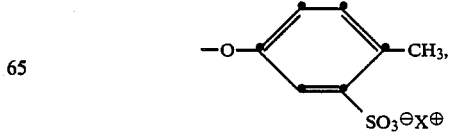

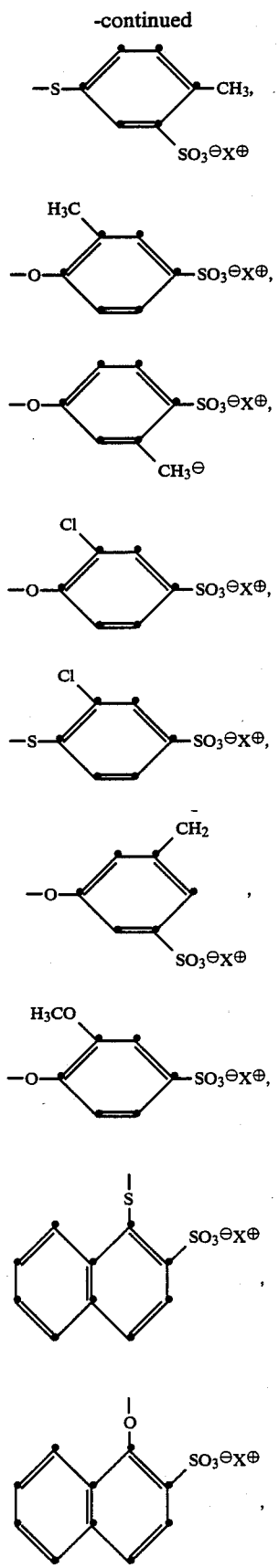

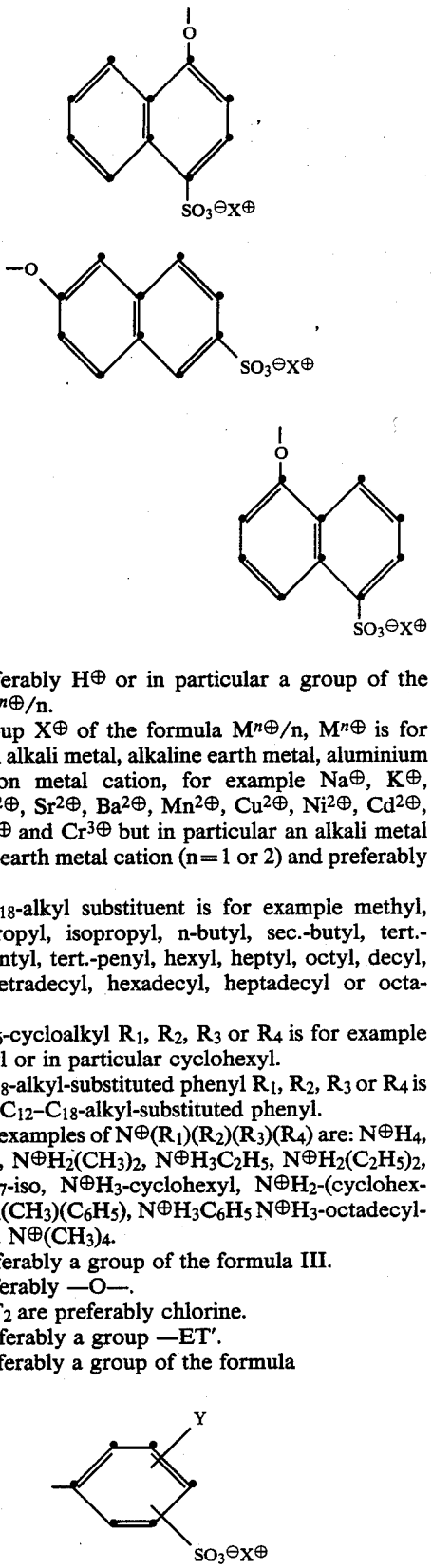

$X^\oplus$ is preferably $H^\oplus$ or in particular a group of the formula $M^{n\oplus}/n$.

In a group $X^\oplus$ of the formula $M^{n\oplus}/n$, $M^{n\oplus}$ is for example an alkali metal, alkaline earth metal, aluminium or transition metal cation, for example $Na^\oplus$, $K^\oplus$, $Mg^{2\oplus}$, $Ca^{2\oplus}$, $Sr^{2\oplus}$, $Ba^{2\oplus}$, $Mn^{2\oplus}$, $Cu^{2\oplus}$, $Ni^{2\oplus}$, $Cd^{2\oplus}$, $Co^{3\oplus}$, $Al^{3\oplus}$ and $Cr^{3\oplus}$ but in particular an alkali metal or alkaline earth metal cation (n=1 or 2) and preferably $Ca^{2\oplus}$.

A $C_1$–$C_{18}$-alkyl substituent is for example methyl, ethyl, n-propyl, isopropyl, n-butyl, sec.-butyl, tert.-butyl, n-pentyl, tert.-penyl, hexyl, heptyl, octyl, decyl, dodecyl, tetradecyl, hexadecyl, heptadecyl or octadecyl.

A $C_5$–$C_6$-cycloalkyl $R_1$, $R_2$, $R_3$ or $R_4$ is for example cyclopentyl or in particular cyclohexyl.

A $C_1$–$C_{18}$-alkyl-substituted phenyl $R_1$, $R_2$, $R_3$ or $R_4$ is preferably $C_{12}$–$C_{18}$-alkyl-substituted phenyl.

Specific examples of $N^\oplus(R_1)(R_2)(R_3)(R_4)$ are: $N^\oplus H_4$, $N^\oplus H_3 CH_3$, $N^\oplus H_2(CH_3)_2$, $N^\oplus H_3 C_2H_5$, $N^\oplus H_2(C_2H_5)_2$, $N^\oplus H_3 C_3H_7$-iso, $N^\oplus H_3$-cyclohexyl, $N^\oplus H_2$-(cyclohexyl)$_2$, $N^\oplus H_2(CH_3)(C_6H_5)$, $N^\oplus H_3 C_6H_5$ $N^\oplus H_3$-octadecylphenyl and $N^\oplus(CH_3)_4$.

D is preferably a group of the formula III.
E is preferably —O—.
$T_1$ and $T_2$ are preferably chlorine.
$T_3$ is preferably a group —ET′.
T′ is preferably a group of the formula and Y is preferably hydrogen.

The tetrachloroisoindolinone pigments of the formula I are known and can be prepared by known methods.

The compounds of the formula II are novel and comprise a further part of the subject-matter of the invention. They are obtained analogously to processes known per se, for example by reaction of lower alkyl (preferably methyl) 3,4,5,6-tetrachloro-2-cyanobenzoate with an alkali salt of a compound of the formulae

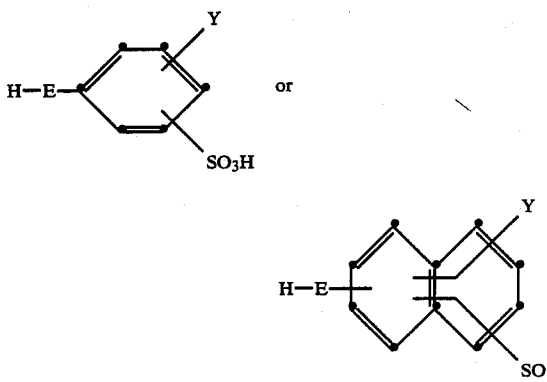

(which are known compounds or can be prepared by known methods) in an hydrophilic organic solvent, e.g. an amide such as dimethylformamide, dimethylacetamide, N-methylpyrrolidone, a ketone such as acetone or methylethylketone or a sulfoxide such as dimethylsulfoxide (see e.g. U.S. Pat. No. 3,884,955), followed by the condensation of the so obtained aryloxy or arylthio substituted 2-cyanobenzoate with an amine of the formula

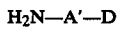

$H_2N-A'-D$ in which A' and D are as defined above, in a molar ratio of 1:1 or 2:1, in the absence of water, in a polar organic solvent, preferably methanol, ethanol or isopropanol, and in the presence of a base, for example sodium methylate or sodium ethylate, and if desired by subsequent reaction with a salt $X^{\oplus}L^{\ominus}$ in which $X^{\oplus}$ is one of the groups $M^{n\oplus}/n$ or $N^{\oplus}(R_1)(R_2)(R_3)(R_4)$ as defined above and $L^{\ominus}$ is for example a hydroxyl, chloride, acetate or nitrate ion.

To prepare the composition according to the invention, advantageously component (a) is first conditioned in a conventional manner and suspended in water. Component (b) is in general added in the form of a free sulfonic acid, and the salt $X^{\oplus}L^{\ominus}$ is added to obtain precipitation. It is also possible to mix component (b) directly in salt form in aqueous suspension with component (a).

The mixing ratios of the components of the compositions according to the invention can vary within wide limits. Preferred mixing ratios, however, range from 1 to 10% by weight of component (b): 99 to 90% by weight of component (a), but in particular from 2 to 8% by weight of component (b): 98 to 92% by weight of component (a) and preferably from 4 to 6% by weight of component (b): 96 to 94% by weight of component (a).

The addition of component (b) preferably takes place, as mentioned above, after the conditioning of component (a). Conditioning is to be understood as meaning the preparation of a fine particle form, for example by alkaline precipitation, dry milling with or without salt, solvent or aqueous milling and salt kneading.

Depending on the conditioning method or intended application, it can be of advantage to add to the pigment not only the amount of component (b) required according to the invention but also certain amounts of texture-improving agents before or after the conditioning process. These comprise in particular fatty acids having at least 18 C atoms, for example stearic or behenic acid or their amides or metal salts, in particular Mg salts, and also plasticizers, waxes, resin acids, such as abietic acid, rosin soap, alkylphenols or aliphatic alcohols, such as stearyl alcohol or vicinal diols, such as dodecane-1,2-diol, and also modified rosin maleate resins or fumaric acid rosin resins. The texture-improving agents are preferably added in amounts of 0.1–30% by weight, in particular 2–15% by weight, based on the end product.

The compositions according to the invention are suitable for use as pigments for coloring high molecular weight organic material.

High molecular weight organic materials which can be colored or pigmented with the compositions according to the invention are for example cellulose ethers and esters, such as ethylcellulose, nitrocellulose, cellulose acetate or cellulose butyrate, natural resins or synthetic resins, such as polymerization resins or condensation resins, such as amino resins, in particular urea- and melamine-formaldehyde resins, alkyd resins, phenolic resins, polycarbonates, polyolefins, polystyrene, polyvinyl chloride, polyamides, polyurethanes, polyesters, rubber, casein, silicone and silicone resins, individually or mixed.

High molecular weight organic materials in dissolved form for use as film formers also come into consideration, for example linseed oil varnish, nitrocellulose, alkyd resins, phenolic resins, melamine resins, acrylic resins and urea-formaldehyde resins.

The high molecular weight organic material compounds mentioned can be present individually or mixed as plastic compositions, melts or in the form of spinnable solutions, surface coatings, paints or printing inks. Depending on the intended use, it has proven advantageous to use the compositions according to the invention as toners or in the form of formulations. Based on the high molecular weight organic material to be pigmented, the compositions according to the invention can be used in an amount of 0.01 to 30% by weight, preferably 0.1 to 10% by weight.

The pigmenting of the high molecular weight organic substances with the compositions according to the invention is effected for example by mixing such a composition, if desired in the form of a master-batch, into these substrates using roll mills or mixing or milling apparatus. The pigmented material is then brought into the desired final form by methods known per se, such as calendering, pressing, extruding, coating, casting or injection moulding. Frequently it is desirable, if the mouldings to be produced are not to be rigid or to reduce their brittleness, to incorporate plasticizers in the high molecular weight compounds before moulding. These plasticizers can be for example esters of phosphoric acid, phthalic acid or sebacic acid. Plasticizers can be incorporated into the polymers before or after incorporation of the compositions according to the invention. It is also possible, if different hues are to be obtained, to add to the high molecular weight organic materials not only the compositions according to the invention but also fillers and other coloring constituents, such as white, colored or black pigments, in any desired amount.

For pigmenting of paints and printing inks, the high molecular weight organic materials and the compositions according to the invention, if desired together with additives, such as fillers, other pigments, siccatives or plasticizers, are finely dispersed or dissolved in a common organic solvent or a solvent mixture. This can be done by dispersing or dissolving the individual components by themselves or, alternatively, several of them together, and only then combining all the components.

The colorings obtained, for example in plastics, fibres, paints or prints, are distinguished by good general properties, such as good dispersibility, high transparency, good over-lacquering, migration, heat, light and weather resistance, and the colored plastics exhibit absence of distortion. In addition, the compositions according to the invention, compared with unmodified tetrachloroisoindolinone pigments, have in particular in paints and printing inks improved rheology, lower separation effects, such as floating in the presence of white pigments, and a lower flocculation tendency.

As a consequence of the good rheological properties of the pigment mixtures according to the invention it is possible to produce paints having high pigment loadings.

The compositions according to the invention are preferably suitable for coloring aqueous and/or solvent-containing paints, in particular automotive paints. Their use is very particularly preferred for metallic effect coatings.

The examples which follow serve to illustrate the invention.

EXAMPLE 1

8.1 g of 30% aqueous sodium hydroxide solution are added dropwise over 1 hour to a solution of 11.8 g of the sodium salt of phenol-4-sulfonic acid and 17.1 g of the methyl ester of tetrachloro-o-cyanobenzoic acid in 150 ml of dimethylsulfoxide. The reaction is then heated to 60° C. for 1 hour and subsequently poured into 500 ml of water. The insoluble constituent is removed by filtration and 200 g of sodium chloride are added to the filtrate. The precipitate is isolated by filtration, washed with a 10% solution of sodium chloride and dried, to give 15.2 g of the sodium salt of a sulfonic acid to which the following formula is assigned on the basis of the elemental analysis:

$C_{15}H_7Cl_3NO_6SNa$

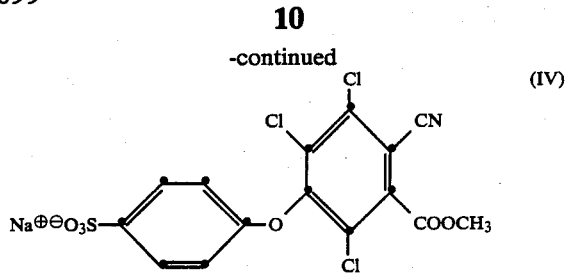

(IV)

The product contains 20–30% of sodium chloride.

12 g of the product of formula IV is added to a solution of 1.35 g of sodium methylate in 80 ml of methanol. The mixture is stirred for 30 minutes and then 1.35 g of p-phenylenediamine are added. The yellowish brown suspension that forms is stirred for 15 hours. After heating to reflux and keeping this temperature for 2 hours, the batch is acidified with 5 ml of glacial acetic acid. The brown precipitate is isolated hot by filtration, washed with methanol and dried, affording 6.8 g of a crude product in the form of the sodium salt.

The corresponding calcium salt is obtained as follows: 2 g of the above sodium salt are heated to 70°–80° C. in 150 ml of water and then an aqueous solution of 3 g of calcium chloride is added. The precipitate is isolated by filtration, washed with a small amount of water and dried, affording 1 g of the dye of the formula V

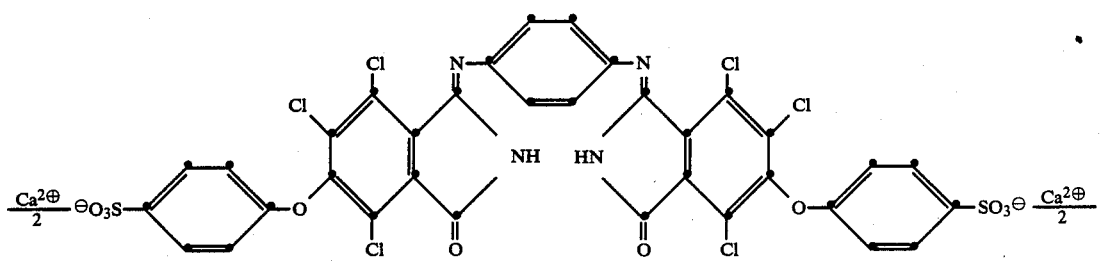

Analysis for $C_{34}H_{14}Cl_6N_4O_{10}S_2Ca$:

|  | C | H | S | Ca |
|---|---|---|---|---|
| theory: | 42,74% | 1,48% | 6,71% | 4,2% |
| found: | 42,9% | 2,2% | 4,9% | 4,31% |

EXAMPLE 2

2.4 g of the product of formula IV, Example 1, are stirred for 15 minutes in a solution of 0.6 g of sodium methylate in 50 ml of methanol. Then 1.88 g of the compound of formula

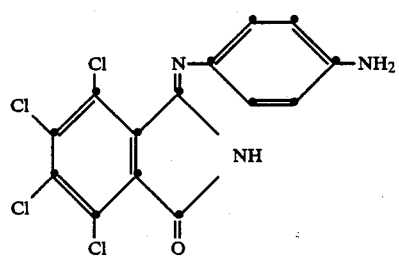

are added. The reaction mixture is stirred for 15 hours at room temperature, then for 2 hours at reflux temperature, and thereafter acidified with 5 ml of glacial acetic acid. The insoluble reaction product is isolated hot by filtration, washed with methanol and dried, affording 2.5 g of the pigment of formula VI

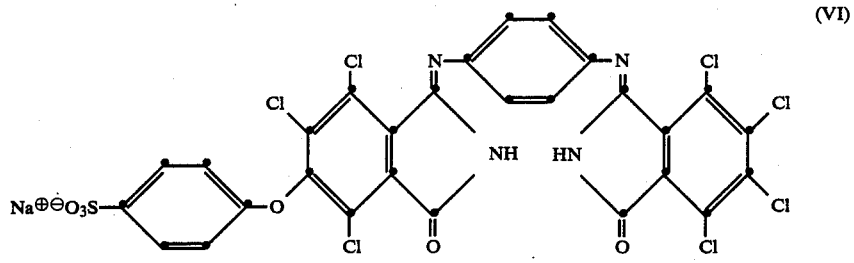

(VI)

Analysis for $C_{28}H_{10}Cl_7N_4O_6SNa$:

|  | C | H | S | Cl |
|---|---|---|---|---|
| theory: | 41.95% | 1.26% | 4.00% | 30.96% |
| found: | 41.72% | 2.01% | 2.30% | 33.46% |

EXAMPLE 3

12 g of the product of formula IV, Example 1, are reacted with 1.35 g of sodium methylate in 80 ml of methanol and then condensation is effected with 2.7 g of p-phenylenediamine under the conditions of Example 1. The following formula VII is assigned to the resultant brown product on the basis of the elemental analysis:

$C_{20}H_{11}Cl_3N_3O_5SNa$

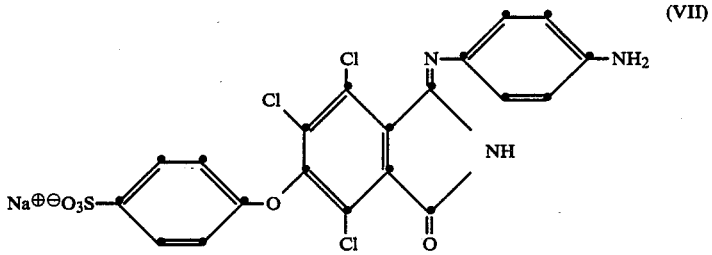

(VII)

EXAMPLE 4

(a) 15 g of bis-[4,5,6,7-tetrachloroisoindolin-3-on-1-ylidene]-phenylene-1,4-diamine are suspended at room temperature in 150 ml of dimethylformamide. 50 ml of a 1N methanolic sodium methylate solution are run with stirring into the yellow suspension, and the clear yellow solution of the sodium salt of the starting isoindoline forms. After one hour of stirring at room temperature 500 ml of water are added to the solution, the resulting precipitate is filtered off, and the filter cake is washed neutral with water.

(b) 27.8 g of the moist filter cake obtained as described above in (a) (36% solids content) are suspended in 150 ml of water. Then 0.5 g of compound VI of Example 2 is added. After stirring for ½ hour at 70°-75° C., 3.6 g of calcium chloride are added. After a further ½ hour the pigment mixture is isolated by filtration at 70° C. and dried, affording 10.55 g of a yellow mixed pigment, which, when incorporated into an alkyd varnish system, imparts enhanced rheological properties as compared with the dried unmodified pigment of Example 4a.

EXAMPLE 5

A comparable enhancement of the rheological properties of common varnishes is attained by using 0.5 g of compound VII of Example 3 in place of the compound VI of Example 2.

EXAMPLE 6

27.8 g of the moist filter cake of bis-[4,5,6,7-tetrachloroisoindolin-3-on-1-ylidene]-1,4-phenylenediamine (36% solids content) obtained according to Example 4a) is heated, with good stirring, to 70° C. with 150 ml of water. Then 0.5 g of compound V of Example 1 is added, the reaction mixture is allowed to cool to room temperature, and the pigment mixture is isolated by filtration and dried. Yield: 10.5 g of a yellow mixed pigment, which when incorporated into an alkyd varnish system, imparts enhanced rheological properties as compared with the dried unmodified pigment of Example 4a.

What is claimed is:
1. A composition containing
(a) an isoindolinone pigment of the formula I

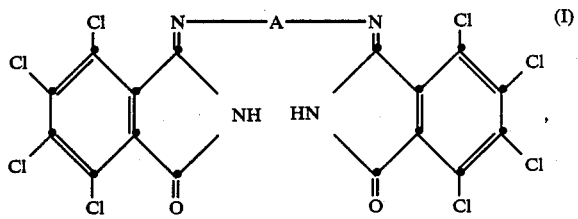

(I)

in which A is one of the groups of the formulae

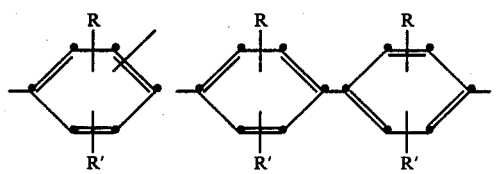

-continued

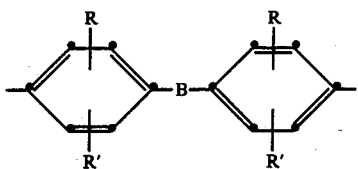

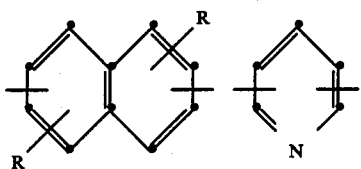

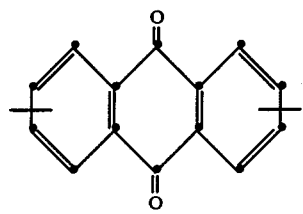

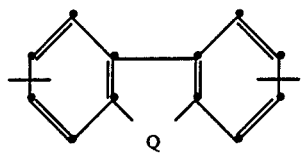

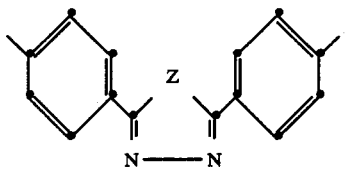

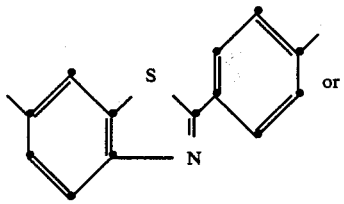

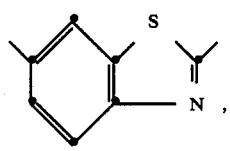

in which B is —O—, —S—, —SO$_2$—, —N=N—, —CH$_2$—, —CH=CH—,

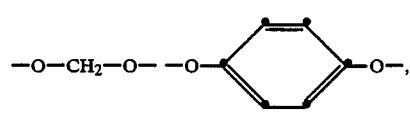

—CONH—, —NHCONH—, or —CONHNHCO—, Q is —O— or —NH— and Z is —O— or —S— and R and R' are independently of each other hydrogen, halogen, C$_1$-C$_4$-alkyl, C$_1$-C$_4$-alkoxy or phenoxy, and (b) a compound of the formula II

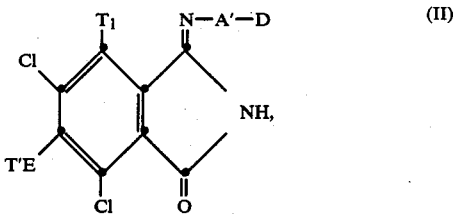

in which A' is as defined above for A, D is hydrogen, amino or a group of the formula III

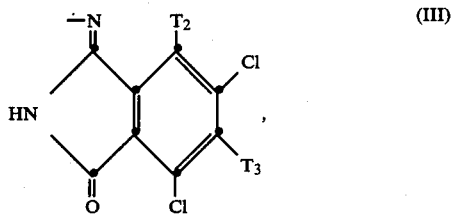

E is —O— or —S—, T$_1$, T$_2$ and T$_3$ independently of one another are chlorine or a group —ET', T' is a group of the formulae

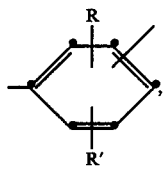

X$^\oplus$ is H$^\oplus$ or a group of the formulae M$^{n\oplus}$/n or N$^\oplus$(R$_1$)(R$_2$)(R$_3$)(R$_4$), M$^{n\oplus}$ is an n-valent metal cation, n is 1, 2 or 3, R$_1$, R$_2$, R$_3$ and R$_4$ are independently of one another hydrogen, C$_1$-C$_{18}$-alkyl, C$_5$-C$_6$-cycloalkyl, unsubstituted or C$_1$-C$_{18}$-alkyl-substituted phenyl or R$_3$ and R$_4$ together with the N atom form a pyrrolidine, imidazolidine, piperidine, piperazine or morpholine radical, or R$_2$, R$_3$ and R$_4$ together with the N atom form a pyrrole, pyridine, picoline, pyrazine, quinoline or isoquinoline radical and Y is hydrogen, halogen, methyl, methoxy or amino.

2. A composition according to claim 1, containing as component (a) a compound of the formula I, in which A is a group of the formula

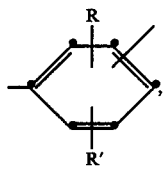

in which R and R' are independently of each other hydrogen, chlorine, methyl, methoxy or ethoxy.

3. A composition according to claim 1, containing as component (a) a compound of the formula I, in which A is unsubstituted p-phenylene.

4. A composition according to claim 1, containing as component (b) a compound of the formula II, in which $X^\oplus$ is a group of the formula $M^{n\oplus}/n$, in which $M^{n\oplus}$ and n are as defined in claim 1.

5. A composition according to claim 1, containing as component (b) a compound of the formula II, in which $X^\oplus$ is a group of the formula $M^{n\oplus}/n$, in which $M^{n\oplus}$ is an alkali metal or alkaline earth metal cation and n is 1 or 2.

6. A composition according to claim 5, wherein $M^{n\oplus}$ is a calcium cation.

7. A composition according to claim 1, containing as component (b) a compound of the formula II, in which A' is a group of the formula

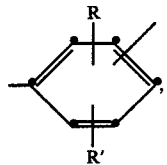

in which R and R' are independently of each other hydrogen, chlorine, methyl, methoxy or ethoxy.

8. A composition according to claim 1, containing as component (b) a compound of the formula II, in which A' is unsubstituted p-phenylene.

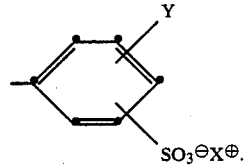

13. A composition according to claim 1, containing as component (b) a compound of the formula II, wherein Y is hydrogen.

14. A composition according to claim 1, containing
(a) an isoindolinone pigment of the formula

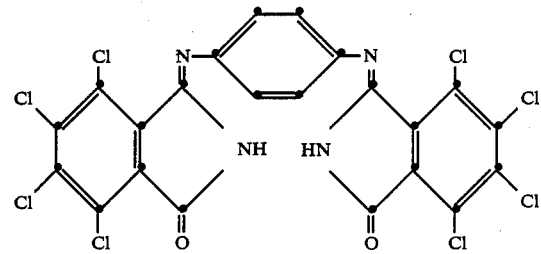

and
(b) a compound of the formula

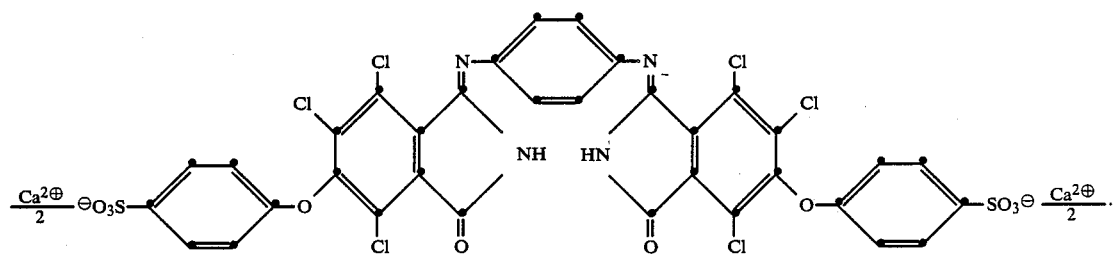

9. A composition according to claim 1, containing as component (b) a compound of the formula II, in which D is a group of the formula III

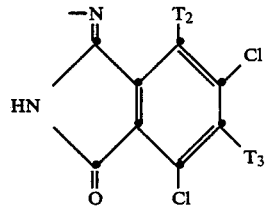

10. A composition according to claim 1, containing as component (b) a compound of the formula II, in which E is —O—.

11. A composition according to claim 1, containing as component (b) a compound of the formula II, in which D is a group of the formula III, $T_1$ and $T_2$ are chlorine and $T_3$ is a group —ET'.

12. A composition according to claim 1, containing as component (b) a compound of the formula II, wherein T' is a group of the formula

15. A composition according to claim 1, wherein the mixing ratio of component (a): component (b) is 99 to 90% by weight: 1 to 10% by weight.

16. A compound of the formula II

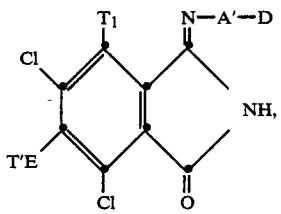

in which A' is one of the groups of the formulae

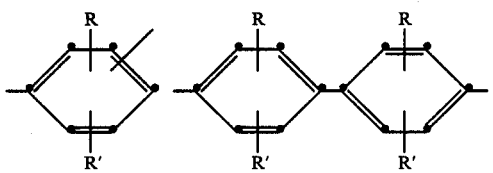

-continued

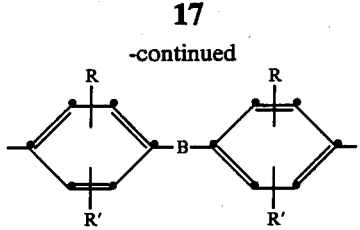

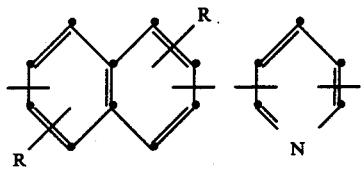

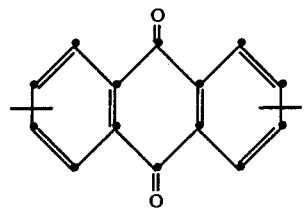

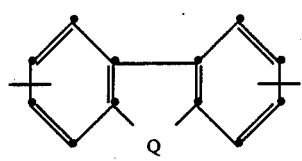

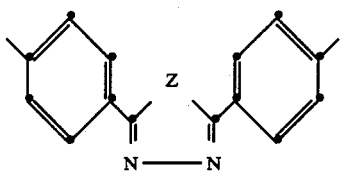

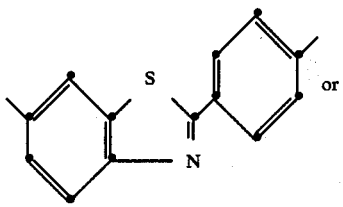

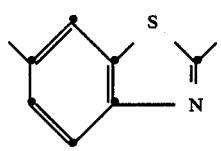

in which B is —O—, —S—, —SO$_2$—, —N=N—, —CH$_2$—, —CH=CH—,

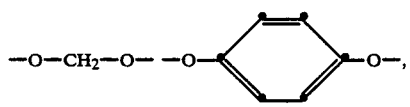

—CONH—, —NHCONH—, or —CONHNHCO—, Q is —O— or —NH— and Z is —O— or —S— and R and R' are independently of each other hydrogen, halogen, C$_1$-C$_4$-alkyl, C$_1$-C$_4$-alkoxy or phenoxy, D is hydrogen, amino or a group of the formula II

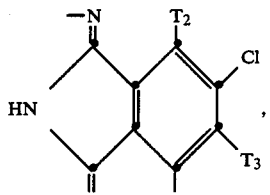

(III)

E is —O— or —S—, T$_1$, T$_2$ and T$_3$ independently of one another are chlorine or a group —ET', T' is a group of the formulae

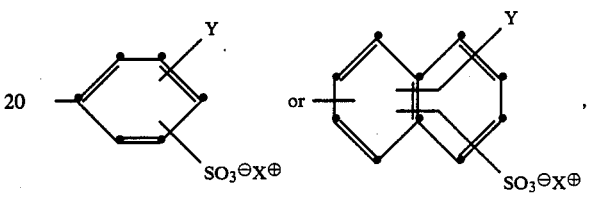

X$^\oplus$ is H$^\oplus$ or a group of the formulae M$^{n\oplus}$/n or N$^\oplus$(R$_1$)(R$_2$)(R$_3$)(R$_4$), M$^{n\oplus}$ is an n-valent metal cation, n is 1, 2 or 3, R$_1$, R$_2$, R$_3$ and R$_4$ are independently of one another hydrogen, C$_1$-C$_{18}$-alkyl, C$_5$-C$_6$-cycloalkyl, unsubstituted or C$_1$-C$_{18}$-alkyl-substituted phenyl or R$_3$ and R$_4$ together with the N atom form a pyrrolidine, imidazolidine, piperidine, piperazine or morpholine radical, or R$_2$, R$_3$ and R$_4$ together with the N atom form a pyrrole, pyridine, picoline, pyrazine, quinoline or isoquinoline radical and Y is hydrogen, halogen, methyl, methoxy or amino.

17. A compound of the formula II according to claim 16, wherein X$^\oplus$ is a group of the formula M$^{n\oplus}$/n as defined in claim 16.

18. A compound of the formula II according to claim 16, wherein X$^\oplus$ is a group of the formula M$^{n\oplus}$/n, in which M$^{n\oplus}$ is an alkali metal or alkaline earth metal cation and n is 1 or 2.

19. A compound of the formula II according to claim 18, wherein M$^{n\oplus}$ is a calcium cation and n is 2.

20. A compound of the formula II according to claim 16, in which A' is a group of the formula

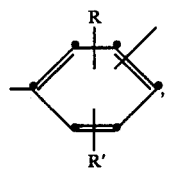

in which R and R' are independently of each other hydrogen, chlorine, methyl, methoxy or ethoxy.

21. A compound of the formula II according to claim 16, in which A' is unsubstituted p-phenylene.

22. A compound of the formula II according to claim 16, in which D is a group of the formula III

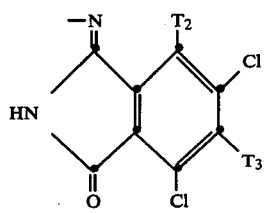 (III)

23. A compound of the formula II according to claim 16, in which E is —O—.

24. A compound of the formula II according to claim 16, in which D is a group of the formula III, $T_1$ and $T_2$ are chlorine and $T_3$ is a group —ET'.

25. A compound of the formula II according to claim 16, wherein T' is a group of the formula

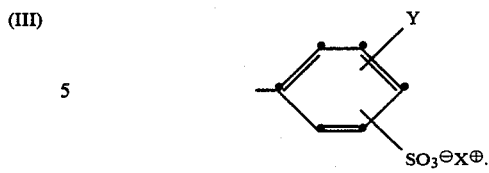

26. A compound of the formula II according to claim 16, wherein Y is hydrogen.

27. A compound of the formula

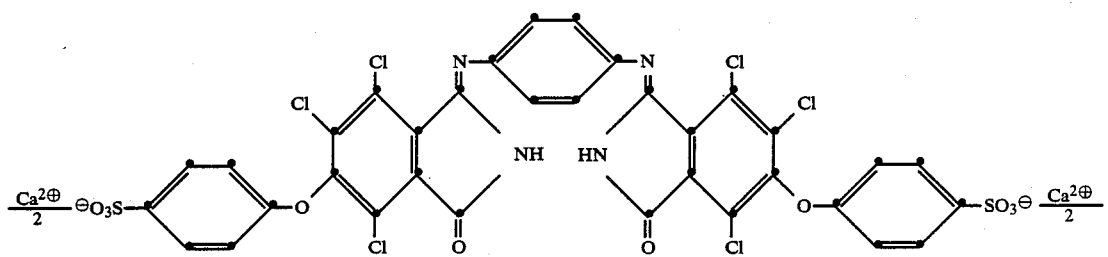

according to claim 16.

28. A process for coloring cellulose ethers, cellulose esters, natural resins and synthetic resins which comprises incorporating therein a composition according to claim 1.

29. A cellulose ether, cellulose ester, natural resin or synthetic resin containing a composition according to claim 1.

* * * * *